US012687941B2

(12) United States Patent
Barnett et al.

(10) Patent No.: US 12,687,941 B2
(45) Date of Patent: Jul. 21, 2026

(54) SYSTEM AND METHOD FOR PROVIDING A MAGNETIC-BASED CONTROLLER FOR A MOBILE ELECTRONIC DEVICE

(71) Applicant: PopSockets LLC, Boulder, CO (US)

(72) Inventors: David B. Barnett, Boulder, CO (US); Steven Dourmashkin, Boulder, CO (US); Altan Nahum, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days.

(21) Appl. No.: 18/384,738

(22) Filed: Oct. 27, 2023

(65) Prior Publication Data

US 2024/0053840 A1 Feb. 15, 2024

Related U.S. Application Data

(63) Continuation of application No. PCT/US2022/026716, filed on Apr. 28, 2022.

(60) Provisional application No. 63/182,104, filed on Apr. 30, 2021.

(51) Int. Cl.
*G06F 3/038* (2013.01)
*G01D 5/14* (2006.01)
*G06F 3/0346* (2013.01)

(52) U.S. Cl.
CPC ........... *G06F 3/0383* (2013.01); *G01D 5/145* (2013.01); *G06F 3/0346* (2013.01); *G06F 2203/0384* (2013.01)

(58) Field of Classification Search
CPC ................. G06F 3/0383; G06F 3/0346; G06F 2203/0384; G01D 5/145; H04M 1/04; H04M 1/0279; G01C 17/02
See application file for complete search history.

(56) References Cited

U.S. PATENT DOCUMENTS

| | | | |
|---|---|---|---|
| 10,678,120 B1 * | 6/2020 | Lozano-Buhl | ............ H01F 7/02 |
| 2017/0223514 A1 | 8/2017 | Do et al. | |
| 2017/0277282 A1 | 9/2017 | Go | |
| 2017/0300087 A1 | 10/2017 | Stryker | |
| 2018/0068145 A1 | 3/2018 | Todeschini | |

(Continued)

OTHER PUBLICATIONS

Transmittal of the International Search Report and Written Opinion issued in PCT/US22/26716 on Jul. 27, 2022.

(Continued)

*Primary Examiner* — Premal R Patel
(74) *Attorney, Agent, or Firm* — Irell & Manella LLP

(57) ABSTRACT

A system comprises a mobile electronic device having a magnetometer sensor and one or more software modules executable by the mobile electronic device. The system further includes a controller having one or more magnets, where the controller may be detachably attached to the mobile electronic device or its case. The magnets and at least a portion of the controller may move relative to the mobile electronic device when attached to the mobile electronic device, where such relative movement is detectable by the magnetometer sensor. The software modules, when executed, may cause the mobile electronic device to perform an action based on magnetic field signals received from the magnetometer sensor that are generated in response to the relative movement of the magnets and at least the portion of the controller.

21 Claims, 6 Drawing Sheets

(56) References Cited

U.S. PATENT DOCUMENTS

| | | | | |
|---|---|---|---|---|
| 2018/0157290 A9* | 6/2018 | Barnett | .................. | H01R 33/90 |
| 2018/0288204 A1* | 10/2018 | Nahum | .................... | A45F 5/10 |
| 2020/0153955 A1* | 5/2020 | Chen | ................ | H04M 1/72469 |

OTHER PUBLICATIONS

Extended European Search Report as issued on Jan. 23, 2025 in
European Application N. 22796721.3.

* cited by examiner 280
270
260
250
240
230
220
210

130

SYSTEM AND METHOD FOR PROVIDING A MAGNETIC-BASED CONTROLLER FOR A MOBILE ELECTRONIC DEVICE

CROSS-REFERENCE TO RELATED APPLICATIONS

This application is a continuation of International Application No. PCT/US22/26716, filed Apr. 28, 2022, which claims priority to U.S. Provisional Patent Application No. 63/182,104, filed Apr. 30, 2021, the entire contents of which are hereby incorporated herein by reference.

FIELD OF THE DISCLOSURE

The present disclosure generally relates to a magnet-based mobile electronic device controller, optionally in the form of a mobile electronic device grip and stand, and multiple algorithms for mapping the motion of such controllers to mobile electronic device actions (e.g., sound output and interface control) based on unique magnetometer and motion sensor profiles.

BACKGROUND

Many portable devices (e.g., tablets, smart phones) are equipped with a magnetometer sensor that can detect the Earth's magnetic field. However, the use of such magnetometer sensors have typically been constrained to only a limited set of mobile applications, such as compasses and navigation applications.

Moreover, the usefulness of magnetometer sensor information has been underappreciated, in part because of the lack of accessories that can generate and/or make use of such information. Therefore, there is a need for a magnet-based controller for mobile electronic devices that address one or more of the aforementioned drawbacks.

SUMMARY OF THE INVENTION

In one embodiment, a system comprises a mobile electronic device having a magnetometer sensor and one or more software modules executable by the mobile electronic device. The magnetometer sensor may be configured to measure a magnetic field and to generate magnetic field signals. The system further includes a controller comprising one or more magnets, where the controller is configured to be detachably attached to the mobile electronic device or to a case of the mobile electronic device. The one or more magnets and at least a portion of the controller may be configured to be movable relative to the mobile electronic device when attached to the mobile electronic device, where such relative movement is detectable by the magnetometer sensor. Moreover, the one or more software modules, when executed by the mobile electronic device, may be configured to receive magnetic field signals from the magnetometer sensor that are generated in response to the relative movement of the one or more magnets and at least the portion of the controller, and to cause the mobile electronic device to perform an action based on said magnetic field signals.

In some embodiments, the mobile electronic device comprises one of a cellular phone, a tablet, and a laptop.

In some embodiments, the relative movement of the one or more magnets and at least the portion of the controller comprises a rotation of the one or more magnets and at least the portion of the controller around a vector normal to the mobile electronic device.

In some embodiments, the relative movement of the one or more magnets and at least the portion of the controller comprises a translation of the one or more magnets and at least the portion of the controller in a direction normal to the mobile electronic device.

In some embodiments, the relative movement of the one or more magnets and at least the portion of the controller comprises a change in angle of the one or more magnets and at least the portion of the controller relative to a plane of the mobile electronic device In some embodiments, the controller comprises a grip accessory configured to expand and collapse in a direction normal to the mobile electronic device.

In some embodiments, the action comprises at least one of enabling or disabling a sound output by the mobile electronic device, display of an image, a lighting function, a camera feature, a user interface control, and a wireless communication features.

In some embodiments, the one or more magnets comprises a single disc shaped magnet located at a center of the controller.

In some embodiments, the one or more magnets comprises at least two spaced apart magnets.

In some embodiments, the at least two spaced apart magnets comprises two magnets oriented relative to the mobile electronic device with opposite polarities.

In some embodiments, the one or more software modules are configured to determine that a state transition for the controller has occurred when a spike of the magnetic field signals above a threshold is detected.

In some embodiments, the one or more software modules are further configured to cause the mobile electronic device to perform the action based on a combination of said magnetic field signals and signals from an accelerometer of the mobile electronic device.

In some embodiments, x, y, and z components of the magnetic field are measured at each of a plurality of time steps to determine a total effective magnetic change resulting from said relative movement of the one or more magnets and at least the portion of the controller.

In some embodiments, the one or more software modules are configured to determine a magnetic field profile of the controller based on said magnetic field signals from the magnetometer sensor that are generated in response to said relative movement of the one or more magnets and at least the portion of the controller In some embodiments, the one or more software modules are configured to determine a type of the controller based on the magnetic field profile of the controller.

In some embodiments, the controller is further configured to wirelessly communicate with the mobile electronic device.

DETAILED DESCRIPTION

As described in more detail below with reference to the figures, the present disclosure relates generally to a system which includes mobile electronic device having a magnetometer sensor and a controller attached to the mobile electronic device or to a case for the mobile electronic device. The controller includes one or more magnets that produce a magnetic field detectable by the device's magnetometer sensor. The mobile electronic device also includes one or more software modules configured to initiate one or more actions in response to input signal(s) from the magnetometer sensor that result from a modification of a position and/or orientation of the controller (and hence of the magnet(s) of the controller) relative to the mobile electronic device. For example, depending on the sensitivity of the mobile device's magnetometer sensor and the strength of the controller's magnet(s), modifications of the controller's position and/or orientation of the controller relative to the mobile device may be detectable and result in one or more responsive actions when the controller is in sufficient proximity to the mobile device, e.g., 12 inches.

Figure 1:
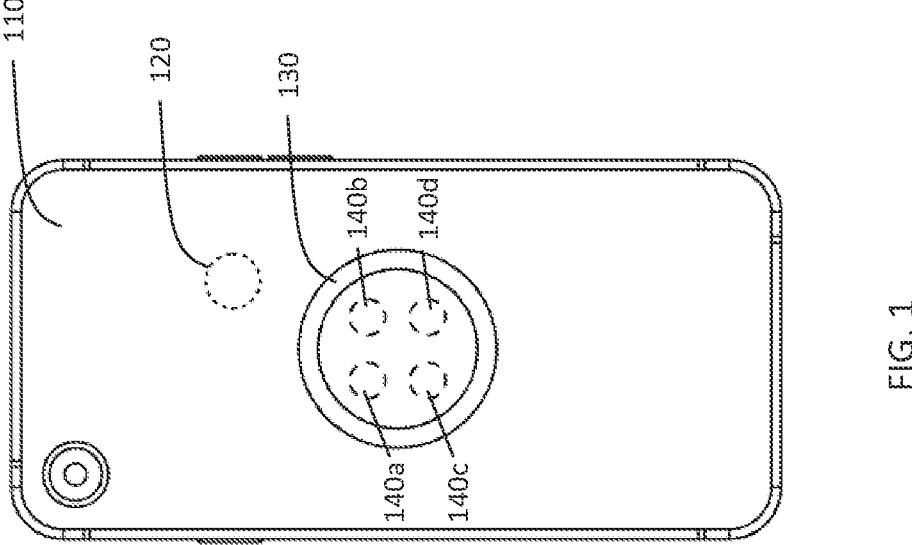
FIG. 1 depicts one embodiment of a system implemented in accordance with the principles of the disclosure.

With reference now to the figures, FIG. 1 illustrates one exemplary system 100 in which one or more aspects of the disclosure can be implemented. System 100 includes mobile electronic device 110, which is depicted as a cellular phone, but may similarly comprise other type of mobile electronic device, such a tablet, laptop, or the like. Regardless, it should be appreciated that the mobile electronic device 110 may include one or more processors, memory for storing computer-executable instructions, user input devices, such as a touch screen, keypad, wireless transceivers, a power source, a display, and other hardware and software components generally known to comprise such mobile electronic devices.

In the system 100 of FIG. 1, mobile electronic device 110 is configured with a magnetometer sensor 120. It should be appreciated that the location and/or orientation of the magnetometer sensor 120 may vary from mobile device to mobile device.

The system 100 further comprises controller 130, described in more detail below, which is generally configured to attach to the mobile electronic device 110 (but can, in other instances, attach to a case for the mobile electronic device 110), as described in more detailed below with respect to FIG. 5. Controller 130 is configured with one or more magnets, which are shown as magnets 140a-140d in the embodiment of FIG. 1. It should be appreciated that more or fewer magnets may be included in controller 130, and that such magnets may have a variety of orientations and locations within controller 130. The system 100 further includes one or more software modules (not shown) that are stored on and configured to be executed by the mobile electronic device 110 in accordance with the principles of the invention.

In certain embodiments, controller 130 may be used to initiate one or more actions using one or more software modules executed by the mobile electronic device 110, such as in response to a modification of a position and/or orientation of the controller 130 relative to the mobile electronic device 110, and more specifically relative to the magnetometer sensor 120. In such embodiments, it is preferable that the one or more software modules be configured to receive input signals from the magnetometer sensor 120. The one or more software modules, generally referred to below as the "magnetic controller software," may comprise application programs, operating system modules, firmware, and/or other software components programmed to receive and interpret sensor data and to perform one or more actions based thereon.

Such actions may be initiated based on the magnetic interaction between the magnets 140a-140d of the controller 140, on the one hand, and the magnetometer sensor 120 of the mobile electronic device 110, on the other hand. Such actions performed as a result of a positional change of controller 130 (specifically of magnets 140a-140d) relative to mobile electronic device 110 (e.g., rotation or change in angle of the controller 130 from the plane of the device 110 or distance from the controller 130 to the front or back of the device 110) include, by way of example only, enabling, disabling, and/or otherwise controlling any of sound output, image display, lighting functions, camera features, user interface controls, wireless communication features, and any other feature or capability of the mobile electronic device 110 that can be controlled by a software executing on the mobile electronic device 110.

In accordance with the principles of the invention, one aspect of the disclosure is a method for detecting relative motion of controller 130 by sensing magnetometer variations of the magnetic field surrounding the controller 130 provided by magnets 140a-140d (specifically, relative to magnetometer sensor 120). In this fashion, magnetic controller modules executing on the mobile electronic device 110 can be configured to perform one or more of the aforementioned actions in response to a change in the magnetic signals measured by the magnetometer sensor 120. In certain embodiments, this change may comprise a vertical, angular or lateral displacement of the controller 130 relative to a front surface or rear surface mobile electronic device 110, such as in the case with the controller 130 comprises an expandable design, as described below with reference to FIGS. 2A-2B and 3A-3B. In certain embodiments, this change may alternatively or in addition comprise rotational displacement of the controller 130, such as rotation around a vector normal to the device 110's major planar surface or relative to a front or rear surface of the mobile electronic device 110, such as in the case where the controller 130 comprises a rotatable design, for example as described in U.S. 2018/0288204, which is hereby incorporated by reference in its entirety.

Figure 2B:
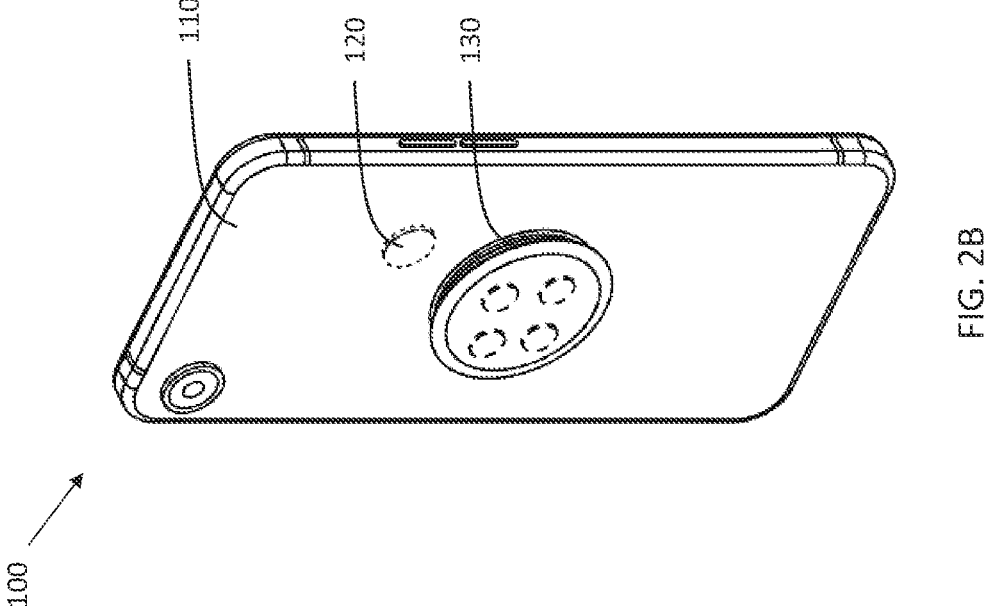
FIGS. 2A-2B depict perspective views of the system of FIG. 1 configured with an expanding/collapsing controller, in accordance with the principles of the disclosure.
Figure 2A:
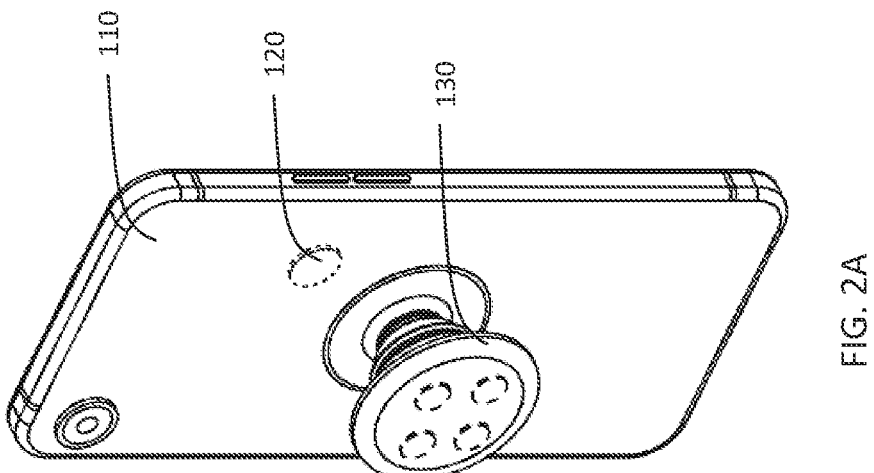
Figure 2A:
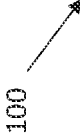
Figure 3A:
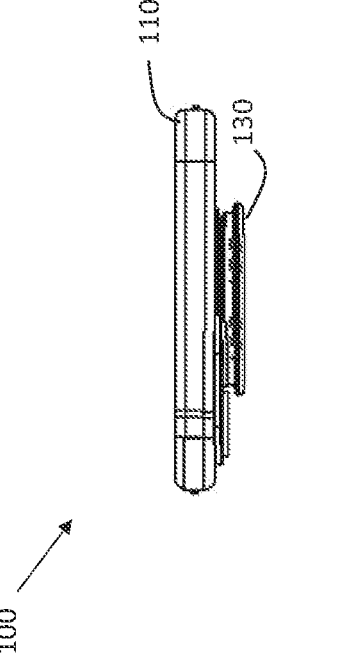
FIGS. 3A-3B depict top views of the system of FIG. 1 configured with an expanding/collapsing controller, in accordance with the principles of the disclosure.
Figure 3B:
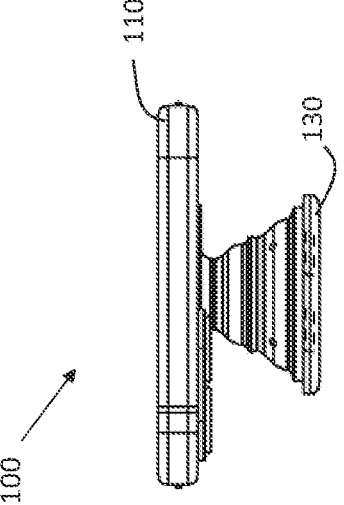

Referring now to FIGS. 2A-2B, depicted are perspective views of one embodiment of the system 100 in which the controller 130 is configured as an expandable/collapsible grip accessory, with FIG. 2A depicting the controller 130 in an expanded position and FIG. 2B depicting the controller 130 in a collapsed position. Similarly, FIGS. 3A-3B depict top views of the system 100 again with controller 130 being configured as an expandable/collapsible grip accessory, with FIG. 3A depicting the controller 130 in an expanded position and FIG. 2B depicting the controller 130 in a collapsed position.

In one or more embodiments, the expandable/collapsible grip accessory may be configured in accordance with the expandable/collapsible design of the commercially available grip and stand product available from PopSockets™. For example, U.S. Pat. No. 8,560,031, filed on Feb. 23, 2012; U.S. Pat. No. 9,970,589, filed on Nov. 9, 2017; U.S. application Ser. No. 15/615,900, filed on Jun. 7, 2017; U.S. application Ser. No. 15/679,934, filed on Aug. 17, 2017; U.S. application Ser. No. 15/803,410, filed on Nov. 3, 2017; U.S. application Ser. No. 15/808,076, filed on Nov. 9, 2017; U.S. application Ser. No. 15/864,402, filed on Jan. 8, 2018; U.S. application Ser. No. 15/864,509, filed on Jan. 8, 2018; U.S. application Ser. No. 15/906,920, filed on Feb. 27, 2018; U.S. application Ser. No. 15/922,601, filed on Mar. 15, 2018; U.S. application Ser. No. 15/952,025, filed on Apr. 12, 2018; U.S. application Ser. No. 15/993,458, filed on May 30, 2018; and U.S. application Ser. No. 16/001,723, filed on Jun. 6, 2018 each describe suitable expandable/collapsible mechanisms, the entirety of each being hereby incorporated by reference.

In accordance with the embodiments of FIGS. 2A-2B and 3A-3B, the controller 130 may be configured to be affixed or removably attached to a front or rear surface of the mobile electronic device 110, while allowing for one or more degrees of freedom of movement of a portion of controller 130 relative to mobile electronic device 200. For instance, controller 130 may include a moveable structure such as an accordion, spring, or bellows, enabling a top portion of the controller 130 to move relative to a bottom portion. In a further embodiment, controller 130 may comprise features that act as a stand or user grip for mobile electronic device 110. In still a further embodiment, a spinning part of controller 130 may act to rotate relative to the other parts of controller 130.

One or more magnets 140a-140d may be arranged on or in controller 130 in a manner configured to affect sensitivity to certain types of motion. Magnets 140a-140d may be spaced maximally apart from each other on controller 130 to maximize the variation in magnetic field while detecting rotational movement relative to mobile device 110. By way of a non-limiting example, if controller 130 comprises two magnets, each magnet may be positioned along an edge or diameter of controller 130 such that one magnet is oriented with positive polarity when relative to the mobile electronic device 110 and the other magnet is oriented with negative polarity relative to the mobile electronic device 110.

Figure 4:
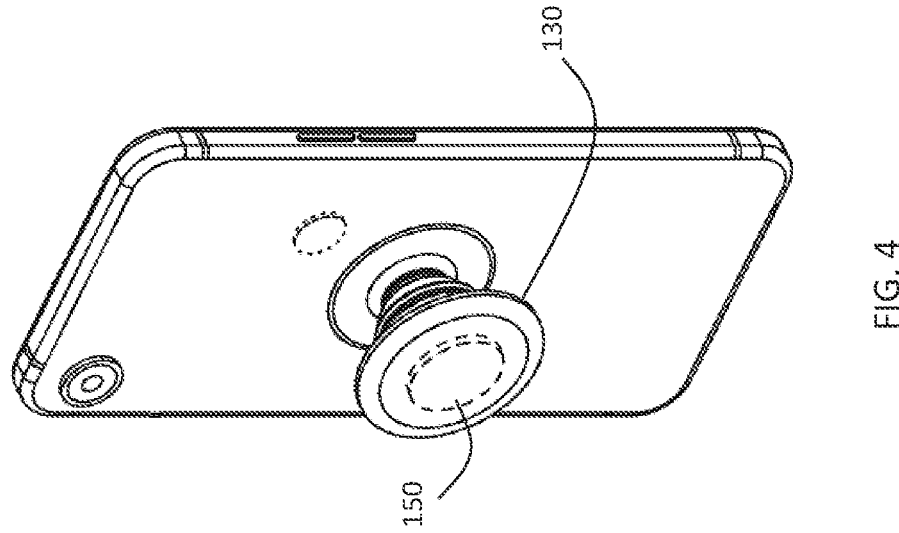
FIG. 4 depicts a perspective view of another example of a system implemented in accordance with the principles of the disclosure.
Figure 4:
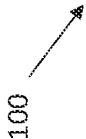

It should be appreciated that magnets 140a-140d may vary in shape, number and position, as noted above, and be arranged on or in a variety of controller 130 shapes. For example, with reference to the embodiment of FIG. 4, controller 130 here comprises a disc magnet 150 placed at the center of controller 100 so as to give the magnetic field radial symmetry, such as when controller 130 spins about an axis, thus providing a consistent magnetic field regardless of the disc's angle.

Figure 5:
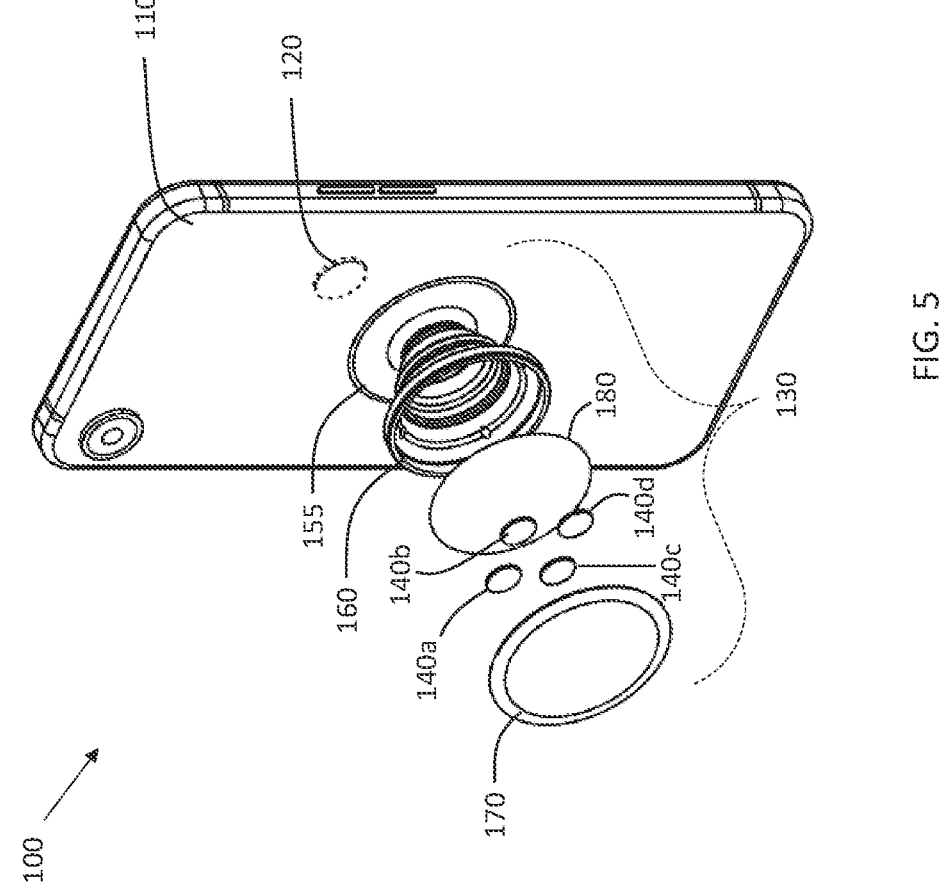
FIG. 5 depicts a perspective view the system of FIG. 1 showing an exploded view of a controller configured in accordance with the principles of the disclosure.

FIG. 5 depicts system 100 with an exploded view of the controller 130 configured in accordance with the principles of the disclosure. As shown in FIG. 5, controller 130 has a platform 155, a body 160 (in an expanded state), and a button 170. The button 170 may include an assembly comprised of magnets 140a-140d and a base plate 180. The platform 155 can also be referred to as a securing element or a socket board and is generally configured to optionally attach the controller 130 to the mobile electronic device 110 (e.g., a front or rear surface), but can, in other instances, attach the controller 130 to a case for the mobile electronic device 110. The platform 155 can, for example, include an adhesive material, for removably attaching the controller 130 to the mobile electronic device 110. In other examples, the platform 155 can include a suction cup, a specific type of adhesive material (e.g., glue, tape), or other means including mechanical locking means such as threads, hook and look fastening means, snap fit, etc., for attaching the controller 130 to the mobile electronic device 110. The platform 155 can be made from any suitable material such as a thermoplastic polymer, polycarbonate, or the like.

Various forms of magnet and controller motions relative to the mobile electronic device that are within the scope of the disclosure are described below, along with descriptions of the algorithms used to measure the type and amount of motion. Representative corresponding actions performed as a result of the motion are also described. The magnetic field in the algorithm descriptions below is measured using a magnetometer sensor in a mobile electronic device, such as magnetometer sensor 120. It should be appreciated that the sensor may include a magnetometer, multi-axis motion sensor, and other motions sensing components. And, as noted above, depending on the sensitivity of the mobile device's magnetometer sensor and the strength of the controller's magnet(s), modifications of the controller's position and/or orientation of the controller relative to the mobile device (e.g., relative to a front or rear surface of the mobile device, angle of the plane of the mobile device, rotation about a vector normal to the phone's major planar surface, etc.) may be detectable and result in one or more corresponding actions when the controller is in sufficient proximity to the mobile device, e.g., 12 inches.

Translation-Based Action Control

In some embodiments, a high-pass filter may be used on each x, y, z component of the total magnetic field signals provided to the magnetic controller software by the mobile electronic device's magnetometer sensor 120. The magnitude of these xyz components may be taken at each time step to detect the total effective change in magnetic field experienced by the mobile device, influenced primarily by the controller 130 (and hence its magnet(s)) changing states given correct tuning of the high-pass filter. In some embodiments, when the magnetic controller software detects a spike in these magnitudes above a calibrated threshold, a state transition may be estimated to have occurred. The sign of the sum of all x, y, z high-passed magnetometer values collected throughout the spike may then be used to infer the direction of the controller's transition (i.e., expanding vs. collapsing, attaching vs. detaching). However, other linear and non-linear signal processing algorithms may be used to infer the direction of the controller's transition. It should further be appreciated that this algorithm may be combined with a similar algorithm using signals provided by an accelerometer of the mobile electronic device to incorporate expected accelerometer profiles caused by such state transitions, thereby providing state-specific detection parameters, which may provide more reliable detection. By way of a non-limiting example, the magnetic controller software may be configured to cause the mobile device to perform one or more of the aforementioned actions (e.g., playing a different sound effect) each time the controller is vertically displaced (transitions), such as by being expanded or collapsed or attached/detached (assuming the controller magnets are close enough to the mobile device for changes in the magnetic field to be detectable by the mobile device's magnetometer.

Rotation-Based Action Control

Back-and-Forth Radial Movements ('Scratch') Detection: A high-pass filter runs on each x, y, z component of the magnetic field that the magnetic controller software collects using the mobile electronic device's magnetometer 120. The magnitude of these xyz components is taken at each time step to detect the total effective change in the magnetic field experienced by the mobile electronic device, influenced primarily by the rotating magnets (e.g., magnets 140a-140d)

of the controller 130 given correct tuning of the high-pass filter. These magnitudes are normalized by the expected maximum (found through calibration step) to then directly infer the magnitude of the "disc scratch" performed on controller 130; i.e., when the filtered magnitudes are higher, the disc is inferred to be spinning faster, and vice versa. However, it should be appreciated that other linear and non-linear signal processing algorithms may be used to infer the state of disc spinning. Moreover, the magnetic controller software may be configured to cause the mobile device to perform one or more of the aforementioned actions (e.g. playing an audio sample (e.g., disc scratch sound effect) or playing audio directly from a song or other musical work) in a manner which is manipulated/varied as a function of the normalized magnitude of the xyz components of the resulting magnetic field when the controller is attached (or in sufficient proximity) to a front or rear surface of the mobile device.

Spin Direction Estimation: The direction in which controller 130 spins (i.e., clockwise or counter-clockwise) may be inferred by first taking the cross product of the high-passed magnetometer xyz component vectors at time k and time k−1. A low-pass filter (which filters out transient noise) may then run on the z components (direction normal to the mobile device's screen) of these cross products. The sign of these low-pass-filtered z components may then be used to determine the directionality of the spin, which in turn may be provided to the magnetic controller software to cause the mobile device to perform one or more of the aforementioned actions (e.g., playing audio forward vs. reverse) when the controller is attached (or in sufficient proximity) to a front or rear surface of the mobile device. As with the other embodiments, it should be appreciated that other linear and non-linear signal processing algorithms may be used to infer the directionality of spin.

Spin Estimation: A low-pass filter is run on top of the scratch detection's high-pass-filtered magnitude measurements to allow constantly-varying magnetic fields to build up over time, such as in the case when the controller 130 is continuously spinning. By incorporating the sign of the spin direction, fast continuous scratches get canceled out. Similar to the 'scratch' detection described above, the final magnitudes may be compared to a calibrated expected maximum to linearly interpolate the inferred spin rate. Alternatively, other linear and non-linear signal processing algorithms may be used either alone or in combination to infer spin rate.

Angle Estimation: In embodiments in which the controller's magnet comprises a disc, as is the case with disc magnet 150 of FIG. 4 described above, the relative angle of the disc may be estimated by comparing current magnetic field measurements with calibrated 360-degree profiles of the disc's magnetic field. In certain embodiments, magnetometer data may be collected with Earth's magnetic field calibrated out so as to avoid unwanted noise in the total magnetic field profiles when the mobile electronic device is rotating. The magnetic controller software may regularly detect when the disc is in a steady spin by running, for example, a Fast-Fourier Transform (FFT) on the xyz magnetic field data and observing a spike in the spin rate frequency range expected during normal use. Thereafter, the magnetic controller software may save the xyz magnetic field profiles from a time window representing a single period of oscillation (e.g., based on the peak frequency from the FFT). Each sample may represent a relative angle from 0-360 degrees, linearly interpolated based on its timestamp (approximating the disc to have a constant rotational velocity throughout the spin). Of course, it should be understood that other linear and non-linear magnetic sensor signal processing algorithms may be used for detecting when the disc is in a steady spin, When a new sample is received, in certain embodiments the root-mean-square (RMS) is calculated from all calibrated samples in the period. The angle may be finally estimated by interpolating between adjacent samples with the lowest RMS values, according to one example. In certain embodiments, the magnetic controller software may continuously self-calibrate and/or warn the user when the minimum RMS values get too high (indicating that calibration is no longer accurate). Similarly, however, other methods for calibration may be used.

State Detection While Spinning: The state of the controller 130 when, for instance configured as a grip in a collapsed, middle, or expanded state, may be inferred by first calibrating the observed amplitudes of each raw x, y, z component of the measured magnetic field when a spinning portion of controller 130 is in a steady spin state (e.g., detected by a threshold within the Spin Estimation algorithm) in each of the three states. Then, in certain embodiments, the RMS of new amplitude measurements are calculated for each of the three states, where the state with the minimum RMS (i.e., with the most similar amplitude measurements) is estimated to be the current state of the spinning portion of controller 100. However, other linear and non-linear magnetic sensor signal processing algorithms may be used for detecting a steady state spin.

In certain embodiments the various outputs estimated by the aforementioned algorithms (e.g., spin rate, state transitions) may be provided to and used by the magnetic controller software to cause the mobile electronic device to perform one or more actions, including playing music, sound effects, etc. In addition, the various outputs estimated by the aforementioned algorithms (e.g., spin rate, state transitions) may be provided to and used by the magnetic controller software to cause the mobile electronic device to perform other actions, including for example, changing volume, scrolling through social media feeds, editing photos and videos, controlling home automation products, etc. Moreover, the magnetic controller software may comprise one or more game-based applications (e.g., fishing reel game, driving game, etc.) that utilize physical movement of the controller (and magnets) relative to the mobile device to carry out various in-game activities.

In certain embodiments, it should further be appreciated that the controller disclosed herein may comprise a magnetic field profile that is based on detected changes in the magnetic field resulting from rotational and/or translation (e.g., expanding vs. collapsing, attaching vs. removing) of the controller/magnets relative to the mobile device. Such magnetic field profile may be used to uniquely identify the controller, for example, to determine which controller type (and grip type) is currently attached to the device (or as described above, within sufficient proximity). Alternatively, as described in more detail below with reference to FIG. 6, in certain embodiments wirelessly powered tag interfaces (such as NFC, RFID, and the like) may be embedded in the controller whereby wireless information can be shared between the controller and other devices. Such tag interfaces may be present in addition to or in lieu of magnetic components in the controller. A controller with such a tag interface may optionally be formed as a mobile device grip, stand, or other accessory type. Moreover, for those embodiments which comprise a wireless tag interface, it should be appreciated that the magnetic controller software may further comprise tracking and information sharing software that implements one or more wireless tag interface communications functions.

Figure 6:
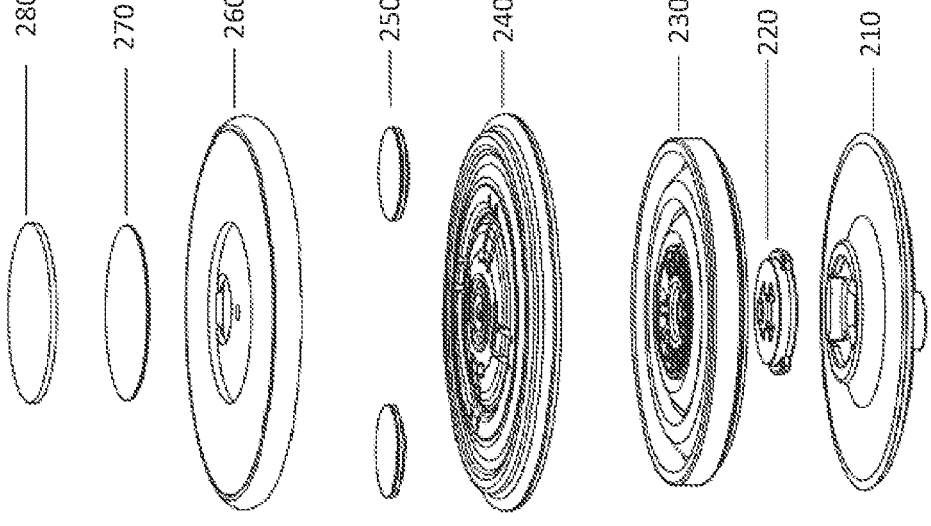
FIG. 6 depicts another embodiment of the controller of FIG. 5 configured in accordance with the principles of the disclosure.
Figure 6:

Referring now to FIG. 6, depicted is another embodiment of the controller 130 of FIG. 5 shown again in an exploded view into which the above-described wireless tag has been integrated. As shown, controller 130 has a platform 210 that is similar to platform 155 of FIG. 5). The controller 130 further comprises a body 230 (similar to body 160) which is coupled to the platform by an optional hub 220. Here, the body 230 is depicted in a collapsed state. The controller 130 further comprises an inner cover assembly 240 which may be configured with a central bearing to provide rotational properties to magnet(s) 250 and top cover (or button) 260. Magnet(s) 250 may then be disposed between the inner cover assembly 240 and the top cover (button) 260, as shown in FIG. 6, or may be integrally formed with either the inner cover assembly 240 or the top cover (button) 260.

Continuing to refer to FIG. 6, the top cover (button) 260 is further configured to accommodate a wireless tag 270, as described above, which may optionally be covered with cap 280. In this fashion, the above wireless functionality can be integrated into the controller 130. Moreover, consistent with description above, changes in the position and/or orientation of controller 130 of FIG. 6 may similarly be detectable by the mobile device's magnetometer when the controller is attached to a front or rear surface of the mobile device, or within sufficient proximity to the mobile device, e.g., 12 inches, which would depend on the sensitivity of the mobile device's magnetometer sensor and the strength of the controller's magnet(s).

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system comprising:
   a mobile electronic device comprising a magnetometer sensor and one or more software modules executable by the mobile electronic device, wherein the magnetometer sensor is configured to measure a magnetic field and to generate magnetic field signals; and a controller comprising a plurality of magnets, wherein the controller is configured to be detachably attached to a rear surface of the mobile electronic device or rear surface of a case of the mobile electronic device, wherein the plurality of magnets and at least a portion of the controller are configured to be movable relative to the mobile electronic device when attached to the mobile electronic device, where such relative movement is detectable by the magnetometer sensor and comprises a translation of the plurality of magnets and at least the portion of the controller in a direction normal to the mobile electronic device when the controller is attached to the rear surface of the mobile electronic device or rear surface of the case of the mobile electronic device, wherein the one or more software modules, when executed by the mobile electronic device, are configured to:

receive magnetic field signals from the magnetometer sensor that are generated in response to said relative movement of the plurality of magnets and at least the portion of the controller, and cause the mobile electronic device to perform an action based on said magnetic field signals.

2. The system of claim 1, wherein the mobile electronic device comprises one of a cellular phone, a tablet, and a laptop.

3. The system of claim 1, wherein said relative movement of the plurality of magnets and at least the portion of the controller further comprises a rotation of the plurality of magnets and at least the portion of the controller around a vector normal to the mobile electronic device.

4. The system of claim 1, wherein said relative movement of the plurality of magnets and at least the portion of the controller further comprises a change in angle of the plurality of magnets and at least the portion of the controller relative to a plane of the mobile electronic device.

5. The system of claim 1, wherein the controller comprises a grip accessory configured to expand and collapse in a direction normal to the mobile electronic device.

6. The system of claim 1, wherein the action comprises at least one of enabling or disabling a sound output by the mobile electronic device, display of an image, a lighting function, a camera feature, a user interface control, and a wireless communication features.

7. The system of claim 1, wherein the one or more software modules are configured to determine that a state transition for the controller has occurred when a spike of the magnetic field signals above a threshold is detected.

8. The system of claim 1, wherein the one or more software modules are further configured to cause the mobile electronic device to perform the action based on a combination of said magnetic field signals and signals from an accelerometer of the mobile electronic device.

9. The system of claim 1, wherein the one or more software modules are configured to determine a magnetic field profile of the controller based on said magnetic field signals from the magnetometer sensor that are generated in response to said relative movement of the plurality of magnets and at least the portion of the controller.

10. The system of claim 9, wherein the one or more software modules are configured to determine a type of the controller based on the magnetic field profile of the controller.

11. The system of claim 1, wherein the controller is further configured to wirelessly communicate with the mobile electronic device.

12. A system comprising:

a mobile electronic device comprising a magnetometer sensor and one or more software modules executable by the mobile electronic device, wherein the magnetometer sensor is configured to measure a magnetic field and to generate magnetic field signals;

a controller comprising one or more magnets, wherein the controller is configured to be detachably attached to the mobile electronic device or to a case of the mobile electronic device;

wherein the one or more magnets and at least a portion of the controller are configured to be movable relative to the mobile electronic device when attached to the mobile electronic device, where such relative movement is detectable by the magnetometer sensor, wherein the one or more software modules, when executed by the mobile electronic device, are configured to:

receive magnetic field signals from the magnetometer sensor that are generated in response to said relative movement of the one or more magnets and at least the portion of the controller, and cause the mobile electronic device to perform an action based on said magnetic field signals, wherein at least two of an x, y, and z component of the magnetic field are measured at each of a plurality of time steps to determine a total effective magnetic change resulting from said relative movement of the one or more magnets and at least the portion of the controller.

13. The system of claim 12, wherein the one or more software modules are further configured to cause the mobile electronic device to perform the action based on a combination of said magnetic field signals and signals from an accelerometer of the mobile electronic device.

14. The system of claim 12, wherein the one or more software modules are configured to determine a magnetic field profile of the controller based on said magnetic field signals from the magnetometer sensor that are generated in response to said relative movement of the one or more magnets and at least the portion of the controller.

15. The system of claim 14, wherein the one or more software modules are configured to determine a type of the controller based on the magnetic field profile of the controller.

16. A system comprising:

a mobile electronic device comprising a magnetometer sensor and one or more software modules executable by the mobile electronic device, wherein the magnetometer sensor is configured to measure a magnetic field and to generate magnetic field signals;

a controller comprising a plurality of magnets, wherein the controller is configured to be detachably attached to a rear surface the mobile electronic device or a rear surface of a case of the mobile electronic device;

wherein the plurality of magnets and at least a portion of the controller are configured to be movable relative to the mobile electronic device when attached to the mobile electronic device, where such relative movement is detectable by the magnetometer sensor and comprises a change in angle of the plurality of magnets and at least the portion of the controller relative to a plane of the mobile electronic device when the controller is attached to the rear surface of the mobile electronic device or rear surface of the case of the mobile electronic device, wherein the one or more software modules, when executed by the mobile electronic device, are configured to:

receive magnetic field signals from the magnetometer sensor that are generated in response to said relative movement of the plurality of magnets and at least the portion of the controller, and cause the mobile electronic device to perform an action based on said magnetic field signals.

17. The system of claim 16, wherein said relative movement of the plurality of magnets and at least the portion of the controller further comprises a rotation of the plurality of magnets and at least the portion of the controller around a vector normal to the mobile electronic device.

18. The system of claim 16, wherein said relative movement of the plurality of magnets and at least the portion of the controller further comprises a translation of the plurality of magnets and at least the portion of the controller in a direction normal to the mobile electronic device.

19. The system of claim 16, wherein the one or more software modules are further configured to cause the mobile electronic device to perform the action based on a combination of said magnetic field signals and signals from an accelerometer of the mobile electronic device.

20. The system of claim 16, wherein the one or more software modules are configured to determine a magnetic field profile of the controller based on said magnetic field signals from the magnetometer sensor that are generated in response to said relative movement of the plurality of magnets and at least the portion of the controller.

21. The system of claim 20, wherein the one or more software modules are configured to determine a type of the controller based on the magnetic field profile of the controller.

* * * * *